(12) United States Patent
Meng et al.

(10) Patent No.: US 12,355,321 B2
(45) Date of Patent: Jul. 8, 2025

(54) BATTERY PACK, POWER TOOL SYSTEM, AND CHARGING SYSTEM

(71) Applicant: Nanjing Chervon Industry Co., Ltd., Nanjing (CN)

(72) Inventors: Chao Meng, Nanjing (CN); Zichun Tang, Nanjing (CN); Yang Zhang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 499 days.

(21) Appl. No.: 17/691,338

(22) Filed: Mar. 10, 2022

(65) Prior Publication Data

US 2022/0200389 A1  Jun. 23, 2022

Related U.S. Application Data

(63) Continuation of application No. PCT/CN2021/096597, filed on May 28, 2021.

(30) Foreign Application Priority Data

Jun. 4, 2020 (CN) .......................... 202010499845.5
Jun. 4, 2020 (CN) .......................... 202021010608.X
Feb. 8, 2021 (CN) .......................... 202120353725.4

(51) Int. Cl.
*H02K 3/52* (2006.01)
*H02K 5/15* (2006.01)
(Continued)

(52) U.S. Cl.
CPC ............... *H02K 3/522* (2013.01); *H02K 5/15* (2013.01); *H02K 7/145* (2013.01); *H02K 21/16* (2013.01)

(58) Field of Classification Search
CPC ............ H02K 3/522; H02K 5/15; H02K 3/34; H02K 21/16
(Continued)

(56) References Cited

U.S. PATENT DOCUMENTS 5,767,596 A * 6/1998 Stark ........................ H02K 5/04
310/91
2004/0046464 A1 * 3/2004 Sano ....................... H02K 3/522
310/71
(Continued)

FOREIGN PATENT DOCUMENTS

CN          103023262 A       4/2013
CN          103973068 A       8/2014
(Continued)

OTHER PUBLICATIONS

ISA/CN, English translation of Written Opinion issued on PCT application No. PCT/CN2021/096597, dated Aug. 30, 2021, 4 pages.

(Continued)

*Primary Examiner* — Terrance L Kenerly
*Assistant Examiner* — Theodore L Perkins
(74) *Attorney, Agent, or Firm* — Greenberg Traurig, LLP

(57) ABSTRACT

A motor includes a stator assembly, a rotor assembly, and a terminal assembly. The stator assembly includes a stator core and a winding wound onto the stator core. The winding includes an input end and an output end. The rotor assembly includes a rotor shaft extending along a direction of a first straight line. The terminal assembly is configured to connect or fix the input end and the output end. The stator core includes first-type laminations. Each of the first-type laminations is provided with connection arms and a special-shaped portion. The special-shaped portions are configured to form an access slot which is configured to connect the (Continued)

terminal assembly when the first-type laminations are stacked along a direction parallel to the first straight line. The access slot is disposed on an outer sidewall of the stator core.

18 Claims, 15 Drawing Sheets

(51) Int. Cl.
  *H02K 7/14* (2006.01)
  *H02K 21/16* (2006.01)
(58) Field of Classification Search
  USPC .......................................................... 310/50
  See application file for complete search history.

(56) References Cited

U.S. PATENT DOCUMENTS

| | | | | |
|---|---|---|---|---|
| 2013/0342041 | A1* | 12/2013 | Ayers | H02K 7/145 |
| | | | | 310/50 |
| 2016/0149474 | A1* | 5/2016 | Smith | H02K 7/145 |
| | | | | 310/68 B |
| 2017/0288499 | A1* | 10/2017 | Beyerl | H02K 7/116 |
| 2017/0294819 | A1* | 10/2017 | Crosby | B25F 5/008 |
| 2018/0262092 | A1* | 9/2018 | Boulanger | H02K 11/33 |
| 2018/0316235 | A1* | 11/2018 | Yamada | H02K 15/10 |

FOREIGN PATENT DOCUMENTS

| | | |
|---|---|---|
| CN | 104393733 A | 3/2015 |
| CN | 105099013 A | 11/2015 |
| CN | 206977225 U | 2/2018 |
| CN | 110249513 A | 9/2019 |
| CN | 209709795 U | 11/2019 |
| CN | 210490680 U | 5/2020 |
| CN | 212381047 U | 1/2021 |
| DE | 102016108841 A | 11/2016 |
| EP | 3436221 A1 | 2/2019 |
| JP | 2007259676 A | 10/2007 |
| WO | 2018/148651 A1 | 8/2018 |

OTHER PUBLICATIONS

ISA/CN, English translation of International Search Report issued on PCT application No. PCT/CN2021/096597, dated Aug. 30, 2021, 3 pages.

EPO, extended European search report issued on European patent application No. 21817083.5, date Nov. 7, 2022, 13 pages.

* cited by examiner

BATTERY PACK, POWER TOOL SYSTEM, AND CHARGING SYSTEM

RELATED APPLICATION INFORMATION

This application is a continuation of International Application Number PCT/CN2021/096597, filed on May 28, 2021, through which this application also claims the benefit under 35 U.S.C. § 119(a) of Chinese Patent Application No. CN 202010499845.5, filed on Jun. 4, 2020, Chinese Patent Application No. CN 202021010608.X, filed on Jun. 4, 2020, and Chinese Patent Application No. 202120353725.4, filed on Feb. 8, 2021, all of which are incorporated herein by reference in their entirety.

BACKGROUND

As a power source, a motor is widely used in various power tools. Generally, the motor drives a transmission assembly or an output assembly by outputting a torque. For some power tools which have compact structures and small spaces in housings, on the one hand, the motors are required to output relatively strong power, and on the other hand, the dimensions of the motors are required to be limited within preset ranges, which require compact structures of the motors themselves. In the related art, the radial dimension and the axial dimension of the motor are increased to different degrees because of a connection relationship between an input end and an output end of a winding and the connection of an external power control wire. How to reduce the dimensions of the motor and make the motor more compact and more adaptable is a technical problem to be urgently solved by those skilled in the art.

SUMMARY

A motor includes a stator assembly, a rotor assembly, and a terminal assembly. The stator assembly includes a stator core and a winding wound onto the stator core, where the winding includes an input end and an output end. The rotor assembly includes a rotor shaft extending along a direction of a first straight line. The terminal assembly is configured to connect or fix the input end and the output end. The stator core includes first-type laminations. Each of the first-type laminations is provided with connection arms and a special-shaped portion. Special-shaped portions are configured to: when the first-type laminations are stacked along a direction parallel to the first straight line, form an access slot which is configured to connect the terminal assembly. The access slot is disposed on an outer sidewall of the stator core.

In some examples, a length L at which the access slot extends along the direction of the first straight line is greater than or equal to 5 mm and less than or equal to 40 mm.

In some examples, a length L at which the access slot extends along the direction of the first straight line is greater than or equal to 5 mm and less than or equal to 20 mm.

In some examples, the terminal assembly includes an insertion member made of an insulation material and a wire hooking rack configured to hook a wire. The wire hooking rack is connected to the insertion member. The insertion member includes a guide rail portion capable of being inserted into the access slot. A length of the access slot along the direction of the first straight line is greater than or equal to the length of the guide rail portion along the direction of the first straight line.

In some examples, the wire hooking rack is configured to be an arc segment deviating from the direction of the first straight line and includes a limiting protrusion capable of being inserted into an insertion slot. A plurality of wire hooking racks are disposed, and a gap between two adjacent wire hooking racks gradually increases along the direction of the first straight line.

In some examples, the wire hooking rack includes a wire hooking portion and a connection portion. A plurality of wire hooking portions are disposed parallel to each other. The connection portion is configured to connect a power control wire.

In some examples, the motor further includes a first end plate and a second end plate. The first end plate further includes a first limiting portion configured to extend along a direction perpendicular to the first straight line and prevent the winding from being detached from the first end plate along the direction of the first straight line.

In some examples, the motor further includes a first end plate and a second end plate. The first end plate further includes a first limiting portion configured to extend along a direction obliquely intersecting with the first straight line and prevent the winding from being detached from the first end plate along the direction obliquely intersecting with the first straight line.

In some examples, the motor further includes a first end plate and a second end plate respectively disposed on two sides of the stator core and a fan. The fan and the second end plate are mounted to the same side of the stator core. A gap exists between the terminal assembly and the first end plate.

In some examples, the motor further includes a first end plate and a second end plate respectively disposed on two sides of the stator core. The first end plate is provided with a limiting protrusion configured to fix a housing of the motor along the direction of the first straight line.

In some examples, a first limiting groove is disposed on an outer sidewall of the limiting protrusion along the direction of the first straight line. A second limiting groove communicating with the first limiting groove is disposed on an outer sidewall of the stator assembly along the direction of the first straight line. A third limiting groove is disposed on an inner wall of the housing of the motor along the direction of the first straight line. The first limiting groove and the second limiting groove directly face and are engaged with the third limiting groove to form a limiting cavity. The motor further includes a limiting member at least partially connected in the limiting cavity.

In some examples, the first limiting groove, the second limiting groove, and the third limiting groove are arc-shaped grooves.

In some examples, the limiting member is in an interference connection with the inner wall of the limiting cavity.

In some examples, the limiting member is a cylindrical pin having a diameter greater than the inner diameter of the limiting cavity.

In some examples, the limiting member is a screw, and an internal thread is disposed on part of the inner wall of the limiting cavity.

An inner-rotor motor includes a stator assembly, a rotor assembly, and a terminal assembly. The stator assembly includes a stator core and a winding wound onto the stator core, where the winding includes an input end and an output end. The rotor assembly includes a rotor shaft extending along a direction of a first straight line. The terminal assembly is configured to connect or fix the input end and the output end. The stator core includes first-type laminations. Each of the first-type laminations is provided with connection arms and a special-shaped portion. Special-shaped portions are configured to: when the first-type laminations are stacked along a direction parallel to the first straight line, form an access slot which is configured to connect the terminal assembly.

In some examples, a length L at which the access slot extends along the direction of the first straight line is greater than or equal to 5 mm and less than or equal to 40 mm.

In some examples, the terminal assembly includes an insertion member made of an insulation material and a wire hooking rack configured to hook a wire. The wire hooking rack is connected to the insertion member. The insertion member includes a guide rail portion capable of being inserted into the access slot. A length of the access slot along the direction of the first straight line is greater than or equal to the length of the guide rail portion along the direction of the first straight line.

In some examples, the wire hooking rack is configured to be an arc segment deviating from the direction of the first straight line and includes a limiting protrusion capable of being inserted into an insertion slot. A plurality of wire hooking racks are disposed, and a gap between two adjacent wire hooking racks gradually increases along the direction of the first straight line.

A power tool includes a motor which includes a stator assembly, a rotor assembly, and a terminal assembly. The stator assembly includes a stator core and a winding wound onto the stator core, where the winding includes an input end and an output end. The rotor assembly includes a rotor shaft extending along a direction of a first straight line. The terminal assembly is configured to connect or fix the input end and the output end. The stator core includes first-type laminations. Each of the first-type laminations is provided with connection arms and a special-shaped portion. Special-shaped portions are configured to: when the first-type laminations are stacked along a direction parallel to the first straight line, form an access slot which is configured to connect the terminal assembly.

DETAILED DESCRIPTION

Figure 1:
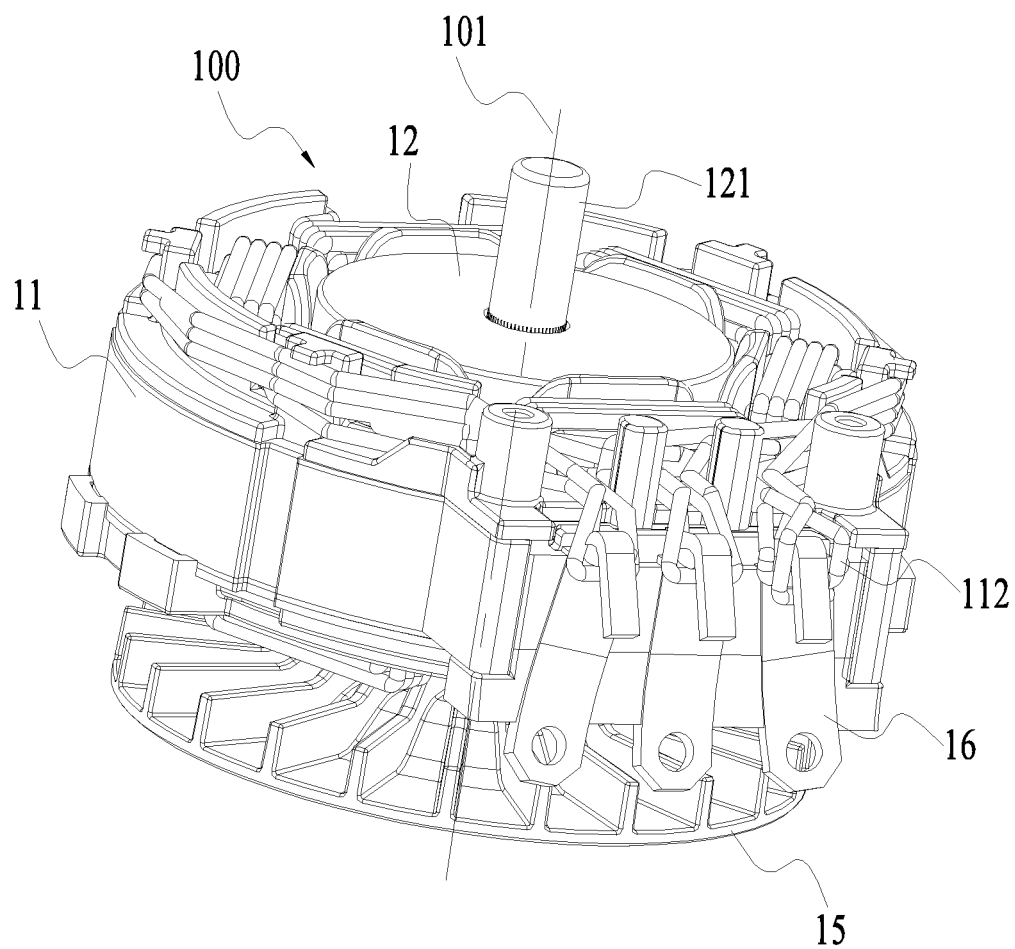
FIG. 1 is a perspective view of a motor without a housing according to example one of the present application.

Generally, the components in examples of the present application, which are described and illustrated in the drawings herein, may be arranged and designed through various configurations.

It is to be noted that similar reference numerals and letters represent similar items in the following drawings, and therefore, once a particular item is defined in one drawing, the item needs no further definition and explanation in subsequent drawings.

In the description of the present application, it is to be noted that orientations or position relations indicated by terms such as "upper", "lower", "left", "right", "vertical", "horizontal", "in" and "out" are those based on the drawings or those in which products of the present application are usually placed when used. These orientations or position relations are intended only to facilitate and simplify the description of the present application and not to indicate or imply that a device or element referred to must have such particular orientations and must be configured or operated in such particular orientations. Thus, these orientations or position relations are not to be construed as limiting the present application. Moreover, terms such as "first", "second", and "third" are merely used for distinguishing the description and are not to be construed as indicating or implying relative importance. In the description of the present application, unless otherwise specified, the term "a plurality of" or "multiple" means two or more.

In the description of the present application, it is to be further noted that unless otherwise expressly specified and limited, terms "disposed" and "connected" are to be understood in a broad sense. For example, the term "connected" may refer to "securely connected", "detachably connected", or "integrated", or may refer to "mechanically connected" or "electrically connected". For those of ordinary skill in the art, specific meanings of the preceding terms in the present application may be understood based on specific situations.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature, the first feature is obliquely on, above, or over the second feature, or the first feature is simply at a higher level than the second feature. When the first feature is described as "under", "below", or "underneath" the second feature, the first feature is right under, below, or underneath the second feature, the first feature is obliquely under, below, or underneath the second feature, or the first feature is simply at a lower level than the second feature.

Examples of the present application are described in detail below, and examples of the examples are illustrated in the drawings. The same or similar reference numerals represent the same or similar elements or elements having the same or similar functions. The examples described below with reference to the drawings are exemplary and intended to explain the present application and not to be construed as limiting the present application.

Figure 2:
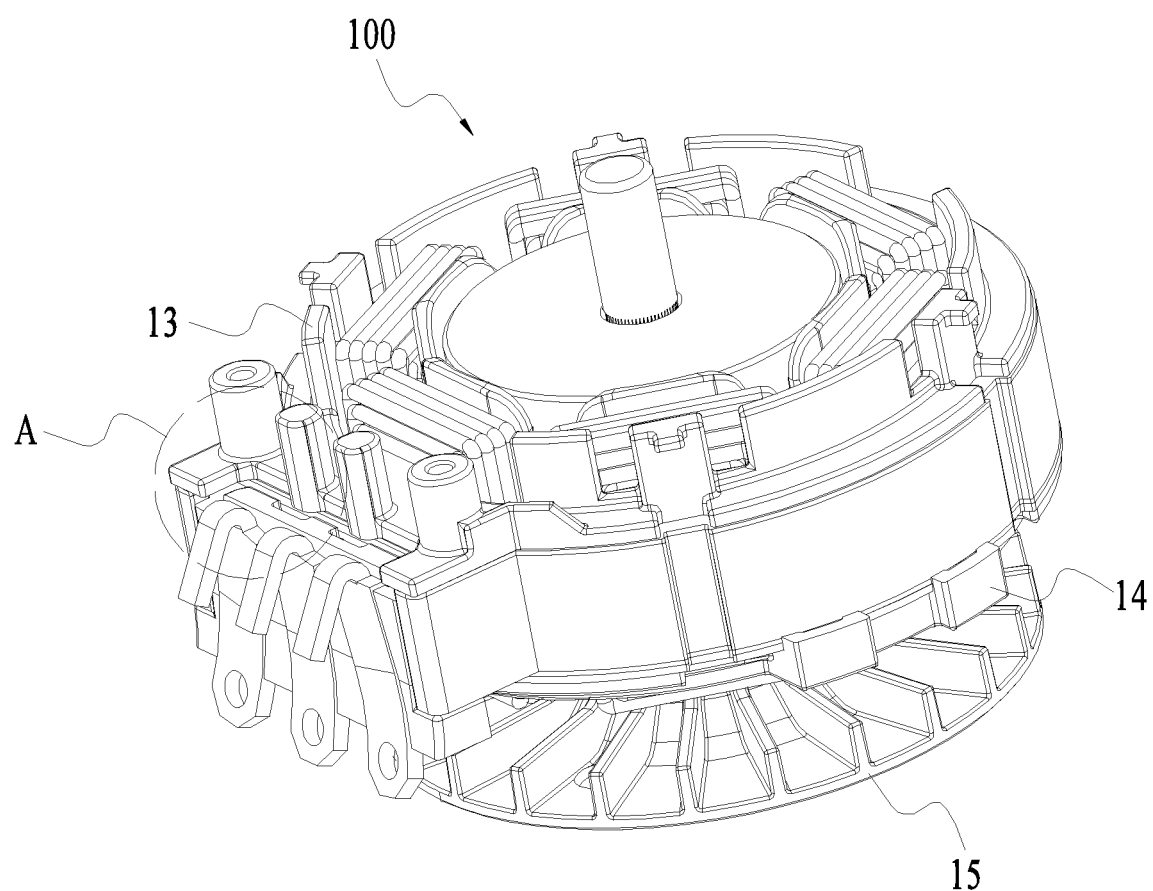
FIG. 2 is a perspective view of the motor in FIG. 1 of the present application when an input end and an output end are not wound.
Figure 3:
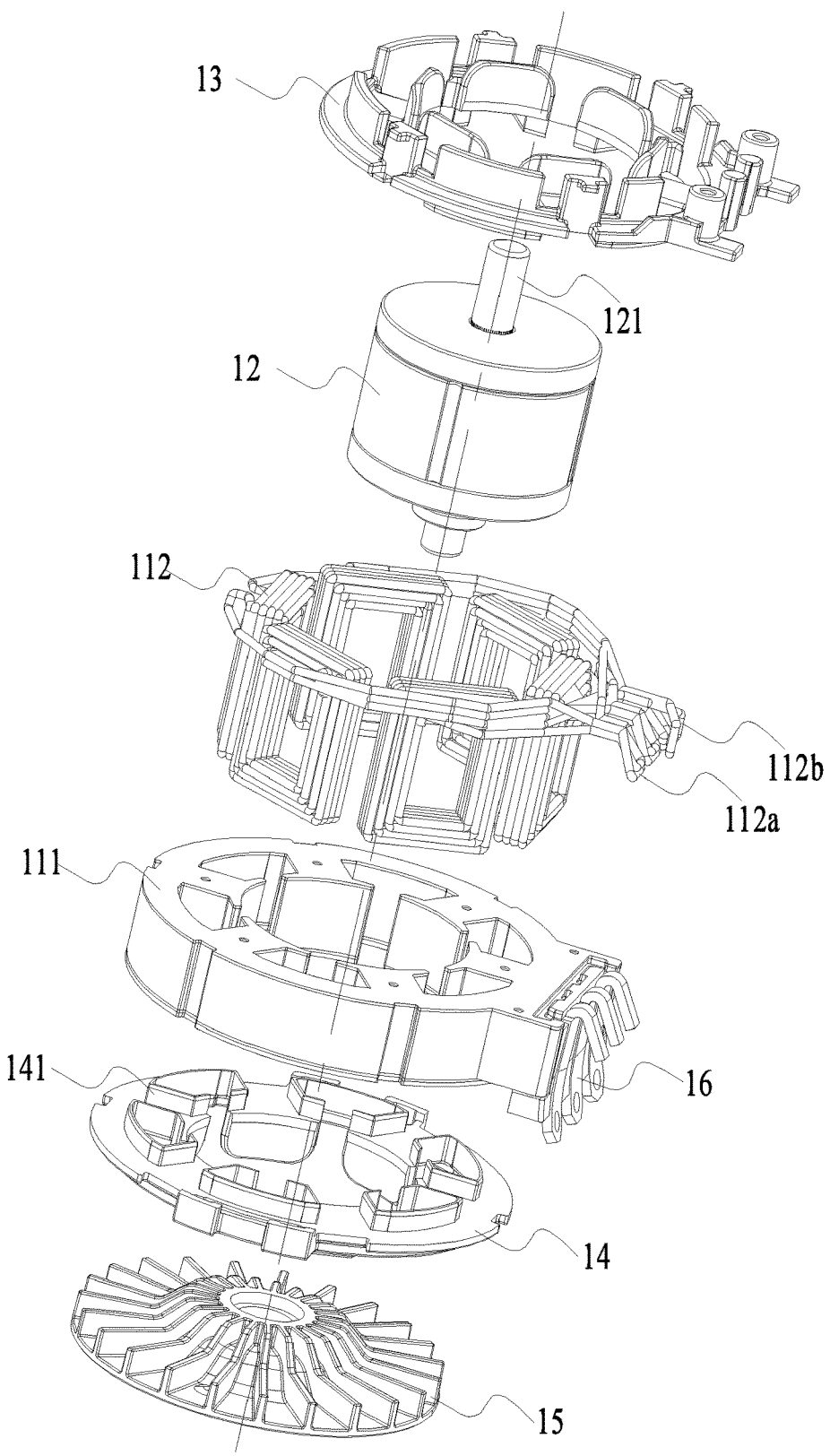
FIG. 3 is an exploded view of the motor in FIG. 1 of the present application.
Figure 4:
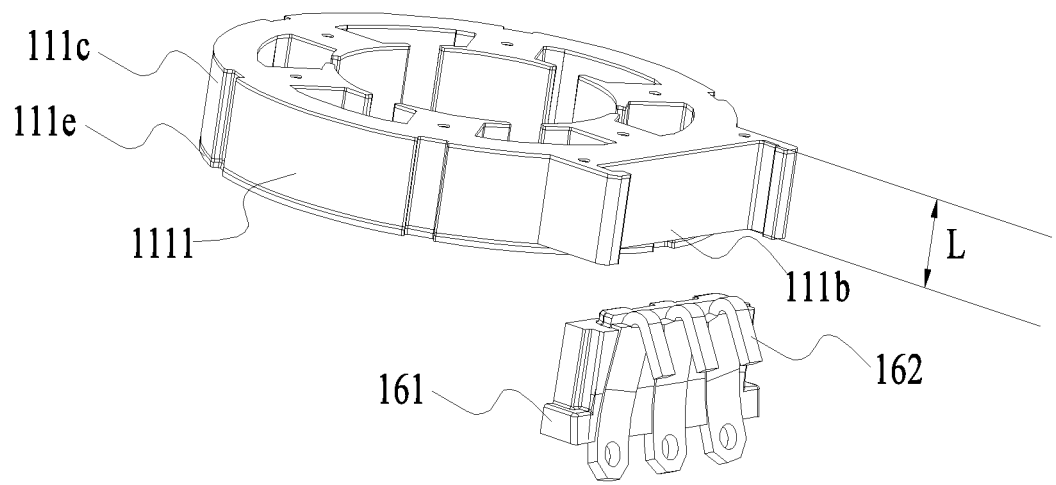
FIG. 4 is an exploded view of a terminal assembly and a stator core of the motor in FIG. 1 of the present application.
Figure 5:
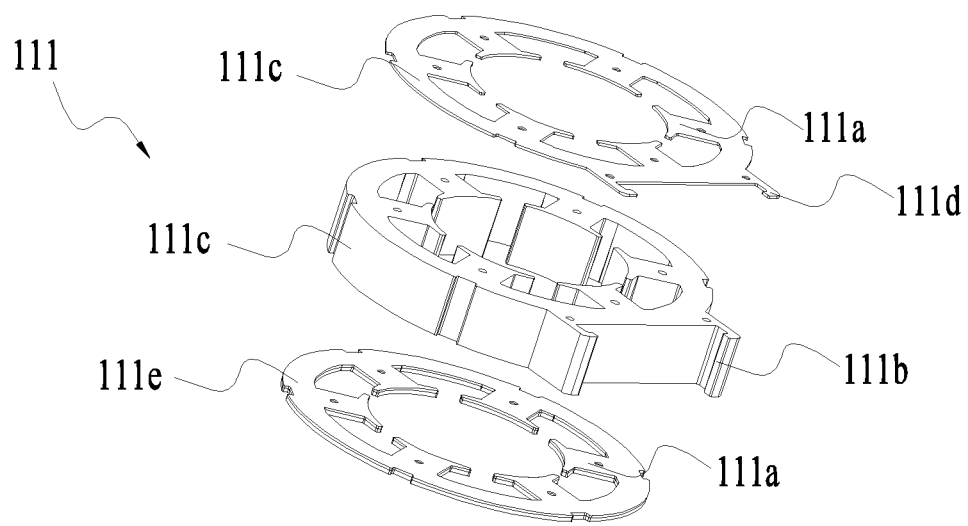
FIG. 5 is an exploded view of the stator core of the motor in FIG. 4 of the present application.

As shown in FIGS. 1 to 3, a motor 100 in a first example is an inner-rotor motor and includes a stator assembly 11, a rotor assembly 12, a first end plate 13, and a second end plate 14. The rotor assembly 12 is at least partially disposed in the stator assembly 11. In some alternative examples, the rotor assembly 12 may also be disposed on an outer side of the stator assembly 11 and fixed through the first end plate 13 and the second end plate 14. Specifically, the rotor assembly 12 includes a rotor shaft 121 extending along a direction of a first straight line 101 (that is, an axial direction). As an implementation, the rotor shaft 121 is further provided with a fan 15 for the heat dissipation of the motor 100. The stator assembly 11 includes a stator core 111 and a winding 112. The winding 112 is wound onto the stator core 111. When the winding 112 is powered on, a rotor of the motor 100 begins to rotate. As shown in FIGS. 4 and 5, the stator core 111 is provided with connection arms 111*a* for the winding 112 to be wound around. A gap exists between adjacent connection arms 111*a*, and the winding 112 is wound around the connection arms 111*a* and at least partially in the gap. The winding 112 includes an input end 112*a* from which the winding 112 is wound around the connection arms 111*a* and an output end 112*b* from which the winding 112 is wound out of the connection arms 111*a*. As an implementation, the motor 100 is provided with a terminal assembly 16 for fixing the input end 112*a* and the output end 112*b*.

The first end plate 13 and the second end plate 14 are disposed on two sides of the stator core 111, respectively. The fan 15 and the second end plate 14 are mounted on the same side of the stator core 111.

As shown in FIGS. 4 and 5, the stator core 111 is provided with an access slot 111*b* configured to connect the terminal assembly 16. Specifically, the stator core 111 is composed of multiple laminations. As an implementation, the laminations include first-type laminations 111*c* and second-type laminations 111*e*. The first-type laminations 111*c* and the second-type laminations 111*e* are integrally connected through their own riveting fasteners. The first-type lamination 111*c* is formed with the connection arms 111*a* and a special-shaped portion 111*d*. The second-type lamination 111*e* is formed with the connection arms 111*a*. Multiple first-type laminations 111*c* are stacked along the direction of the first straight line 101, and special-shaped portions 111*d* of the first-type laminations 111*c* form the preceding access slot 111*b*. The access slot 111*b* is disposed on an outer wall 1111 of the stator core 111. The access slot 111*b* is formed with a bayonet for the terminal assembly 16 to be inserted into and capable of fixing the terminal assembly 16. To enable the access slot 111*b* to effectively fix the terminal assembly 16, the access slot 111*b* has a preset length L along the direction of the first straight line 101, where L is greater than or equal to 5 mm and less than or equal to 40 mm. More specifically, L is greater than or equal to 5 mm and less than or equal to 20 mm. When the terminal assembly 16 is connected to the access slot 111*b*, a bonding member may also be disposed on the access slot 111*b*, thereby further increasing reliability of the connection between the access slot 111*b* and the terminal assembly 16. In fact, the length L defines the length or number of the first-type laminations 111*c* along the direction of the first straight line 101, that is, the length of the first-type laminations 111*c* along the direction of the first straight line 101 is limited within a preset length range or a preset number range. It is to be explained here that a length of the terminal assembly 16 along the direction of the first straight line 101 is substantially configured to be within a preset range as long as the input end 112*a* and the output end 112*b* of the winding 112 can be effectively wound. With such a setting, the length of the terminal assembly 16 along the direction of the first straight line 101 determines the length or number of the first-type laminations 111*c* along the direction of the first straight line 101. The length of the access slot 111*b* formed by the first-type laminations 111*c* along the direction of the first straight line 101 is greater than or equal to a length of a guide rail portion of the terminal assembly 16 along the direction of the first straight line 101.

To adjust the dimension of the motor 100, the number of the second-type laminations 111*e* may also be adjusted so that a length of the stator core 111 along the direction of the first straight line 101 is adjusted, thereby controlling a space occupied by the motor 100 along the direction of the first straight line 101. For a power tool having relatively large power output, the number of the second-type laminations 111*e* may be increased so that the dimension and output power of the motor 100 are adaptable to a requirement for high power. Under such a premise, the input end 112*a* and the output end 112*b* of the winding 112 are disposed on the access slot 111*b* so that the space occupied by the motor 100 along the direction of the first straight line 101 can be effectively controlled and the dimension of the entire motor can be controlled. For a power tool that outputs relatively low power and occupies a relatively small space, the number of the second-type laminations 111*e* is adjusted so that the dimension of the motor 100 along the direction of the first straight line 101 may also be controlled. The input end 112*a* and the output end 112*b* of the winding 112 are disposed on the access slot so that the dimension of the motor 100 along the direction of the first straight line 101 can be further reduced. Thus, a driving portion of the power tool occupies a relatively small space, thereby facilitating the reduction of the dimension of the power tool and optimizing operation experience of a user.

Figure 6:
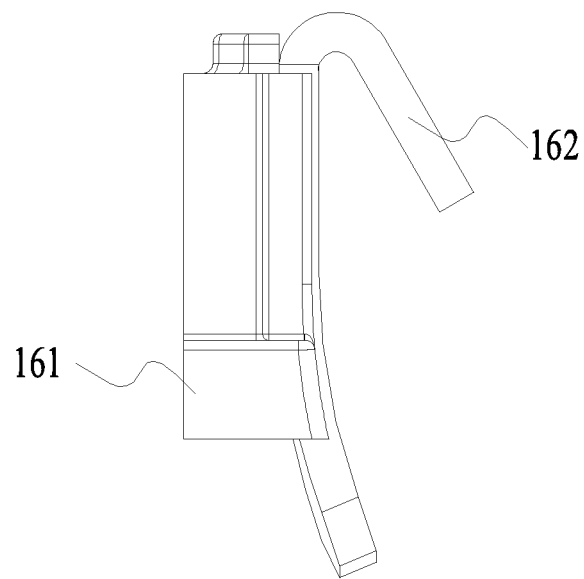
FIG. 6 is a left view of the terminal assembly of the motor in FIG. 4 of the present application.
Figure 7:
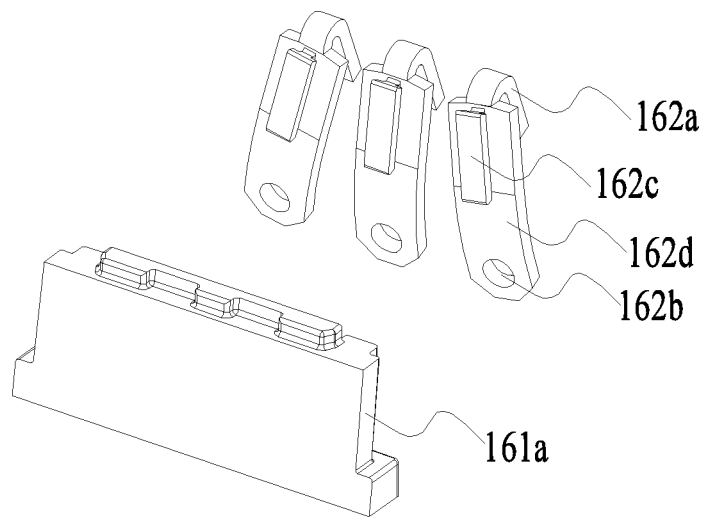
FIG. 7 is an exploded view of the terminal assembly of the motor in FIG. 4 of the present application.
Figure 8:
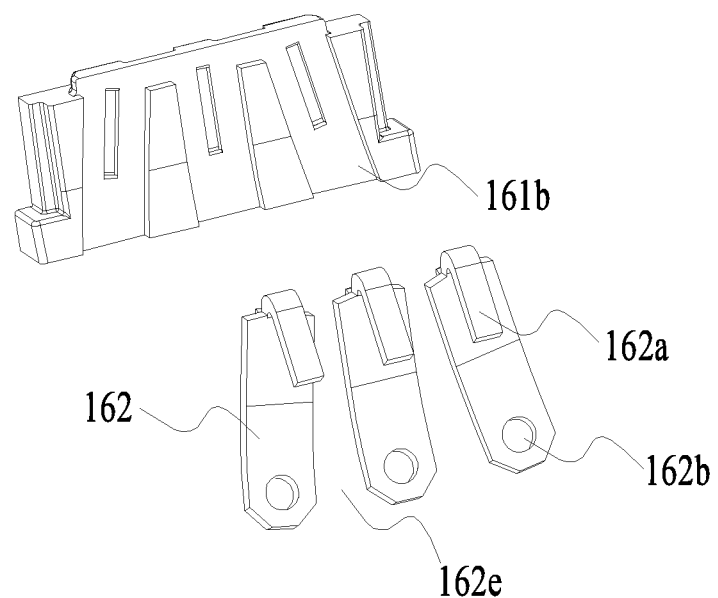
FIG. 8 is an exploded view of the terminal assembly of the motor in FIG. 4 of the present application from another angle.

As shown in FIGS. 6 to 8, the terminal assembly 16 includes an insertion member 161 and a wire hooking rack 162 configured to hook a wire. The insertion member 161 includes a guide rail portion 161*a* which can be inserted into the access slot 111*b* and an insertion slot 161*b* for the wire hooking rack 162 to be inserted into. The insertion member 161 is made of an insulation material and extends substantially along a direction parallel to the first straight line 101. The length of the access slot 111*b* formed by the first-type laminations 111*c* along the direction of the first straight line 101 is greater than or equal to the length of the guide rail portion 161*a* of the terminal assembly 16 along the direction of the first straight line 101. The wire hooking rack 162 is inserted into the insertion slot 161*b*. The wire hooking rack 162 is specifically an arc segment 162*d* deviating from the direction of the first straight line 101. With such a design, the wire hooking rack 162 can further deviate from the stator core 111. The wire hooking rack 162 further includes a first end and a second end. The first end is formed with a wire hooking portion 162*a* which is hook-shaped. The wire hooking portion 162*a* can easily hook the input end 112*a* and the output end 112*b* of the winding 112 so that the input end 112a and the output end 112b are fixed to the wire hooking portion 162a. The second end of the wire hooking rack 162 is formed with a connection portion 162b configured to connect a power control wire. The power control wire can supply electric power to the winding 112. As an implementation, the connection portion 162b is provided as a circular through hole which can facilitate the welding of the power control wire onto the wire hooking rack 162. The wire hooking rack 162 is further provided with a limiting protrusion 162c connected to the insertion slot 161b. The limiting protrusion 162c can be inserted into the insertion slot 161b, thereby facilitating the positioning between the wire hooking rack 162 and the insertion member 161 and further facilitating the engagement between the wire hooking rack 162 and the insertion member 161. Multiple wire hooking racks 162 are disposed. In a plane extending along the insertion member, an included angle between the multiple wire hooking racks is configured to be an acute angle. A gap 162e between two adjacent wire hooking racks 162 gradually increases along the direction of the first straight line 101.

Figure 9:
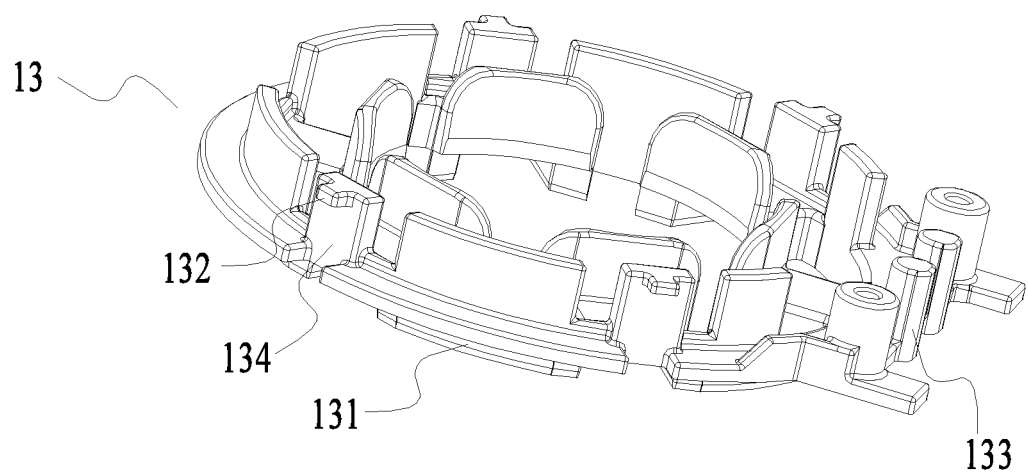
FIG. 9 is a perspective view of a first end plate of the motor in FIG. 3 of the present application.
Figure 10:
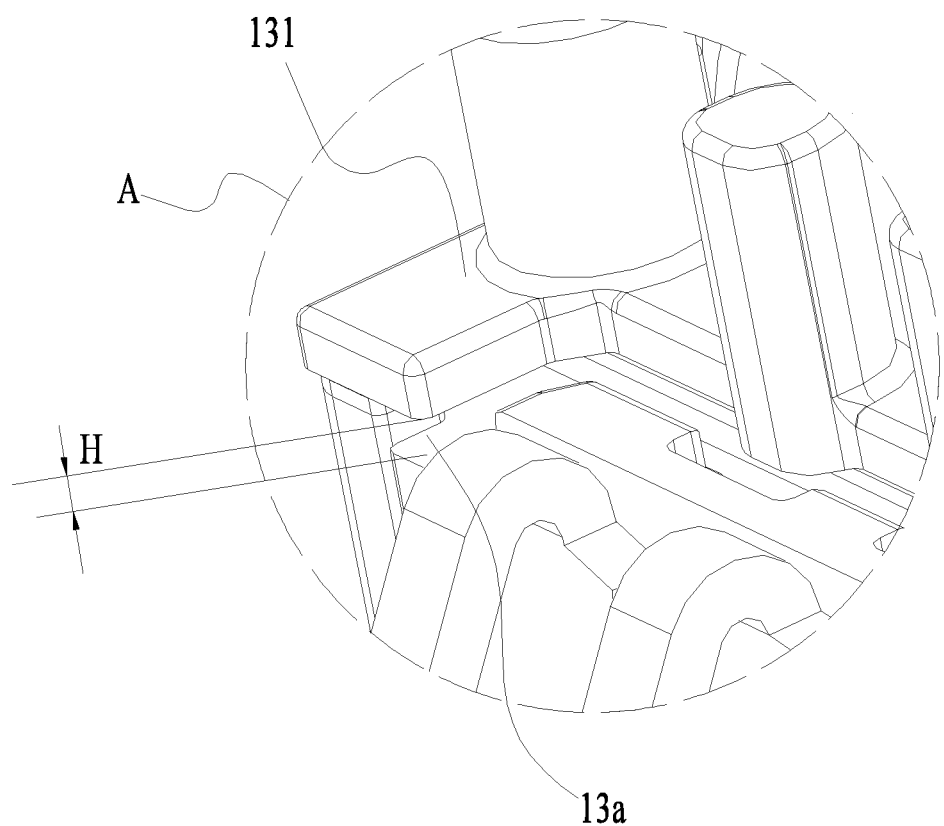
FIG. 10 is a partial enlarged view illustrating a part A in FIG. 2 of the present application.

As shown in FIGS. 1, 9, and 10, the first end plate 13 includes a first fixing end 131 fixed to the stator core 111 and limiting portions for the winding 112 to be wound around. The first fixing end 131 is configured to be capable of being mounted in the preceding gap between the connection arms 111a of the stator core 111. The second end plate 14 includes a second fixing end 141 fixed to the stator core 111, and the second fixing end 141 can be configured to be mounted in the preceding gap between the connection arms 111a of the stator core 111. The limiting portions of the first end plate 13 include a first limiting portion 132 and second limiting portions 133. The first limiting portion 132 is provided as a protrusion extending along a direction perpendicular to the first straight line 101 and can prevent part of the winding 112 wound onto the first end plate 13 from being detached from the first end plate 13 along the direction of the first straight line 101. In other examples, the first limiting portion may also be configured to extend along a direction obliquely intersecting with the first straight line 101 and can prevent part of the winding 112 wound onto the first end plate 13 from being detached from the first end plate 13 along the direction obliquely intersecting with the first straight line 101. In fact, a main body of the first end plate 13 together with the first limiting portion 132 forms a limiting slot 134 into which the winding 112 may be wound. With such a design, both the input end 112a and the output end 112b of the winding 112 can be wound onto the first end plate 13, and a winding mode of the winding 112 is optimized so that the input end 112a or the output end 112b of the winding 112 is prevented from being separately disposed on the first end plate 13 and the second end plate 14, thereby effectively reducing the dimension of the motor 100 along the direction of the first straight line 101. As an optional example, the first limiting portion 132 is disposed on the first end plate 13, thereby effectively integrating the input end 112a and the output end 112b of the winding 112. The second limiting portions 133 of the first end plate 13 are provided as protrusions distributed substantially along the direction of the first straight line 101 and can cooperate with the wire hooking racks 162 to isolate wires of the windings 112 during the arrangement of the wires. Multiple second limiting portions 133 are disposed so that multiple channels can be formed to facilitate the isolation between the input end 112a and the output end 112b of the winding 112.

As shown in FIGS. 1 and 10, the wire hooking rack 162 is mounted to the insertion member 161. The limiting protrusion 162c disposed on the wire hooking rack 162 is inserted into the insertion slot of the insertion member 161 so that the wire hooking rack 162 and the insertion member 161 are connected integrally. In this case, the insertion member 161 and the wire hooking rack 162 are configured to be the terminal assembly 16 which can be mounted into the access slot 111b of the stator core 111. In this process, the guide rail portion disposed on the insertion member 161 can guide the entire terminal assembly 16 into the access slot 111b, thereby greatly facilitating the assembly and positioning of the terminal assembly 16. In this case, when the first end plate 13 and the second end plate 14 are fixed to the stator core 111, one end of the terminal assembly 16 farther from the second-type laminations 111e has a preset distance H from the first end plate 13, where H is greater than 1 mm and less than or equal to 5 mm. That is, a gap 13a exists between the terminal assembly 16 and the first end plate 13. As an alternative implementation, H may also be configured to be greater than 1 mm and less than or equal to 3 mm. It is to be explained here that the preset distance H is for any position of the terminal assembly 16 away from the second-type laminations 111e. With such a configuration, when the winding 112 is wound around the wire hooking rack 162 through the channels formed by the preceding second limiting portions 133, on the one hand, the input end 112a and the output end 112b of the winding 112 can be away from the stator core 111 when connected to the wire hooking portion 162a of the wire hooking rack 162, thereby providing a better insulation effect. On the other hand, it is also possible to provide a space between the input end 112a and the output end 112b of the winding 112 and the terminal assembly 16 for fixing members to be received so that the winding 112 can be disposed in a relatively fixed position and prevented from vibrating with the rotor during the high-speed operation of the motor 100, thereby avoiding damages to the input end 112a or the output end 112b of the winding 112 due to resonance.

Figure 11:
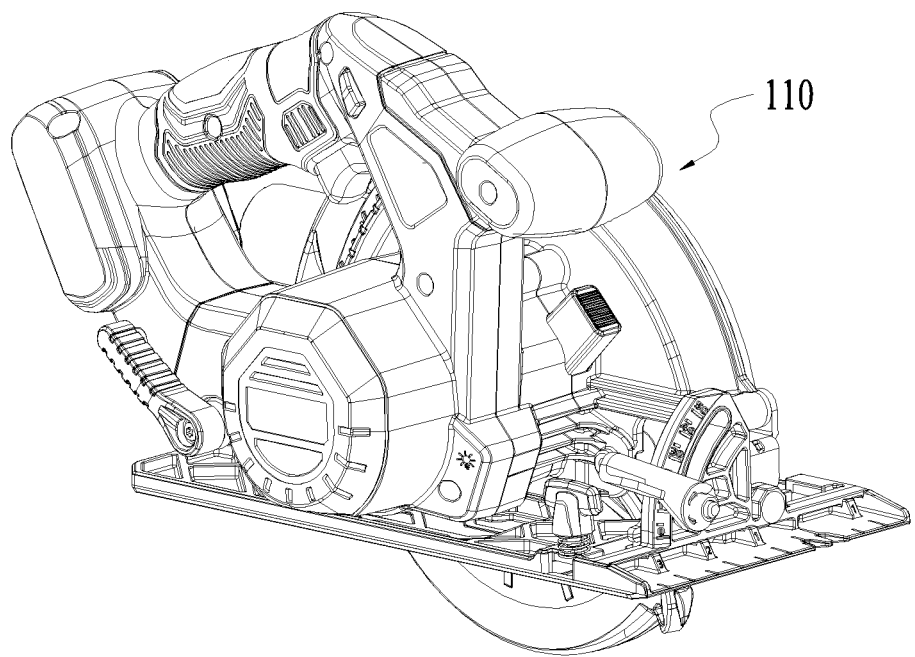
FIG. 11 is a perspective view of a circular saw according to example one of the present application.
Figure 12:
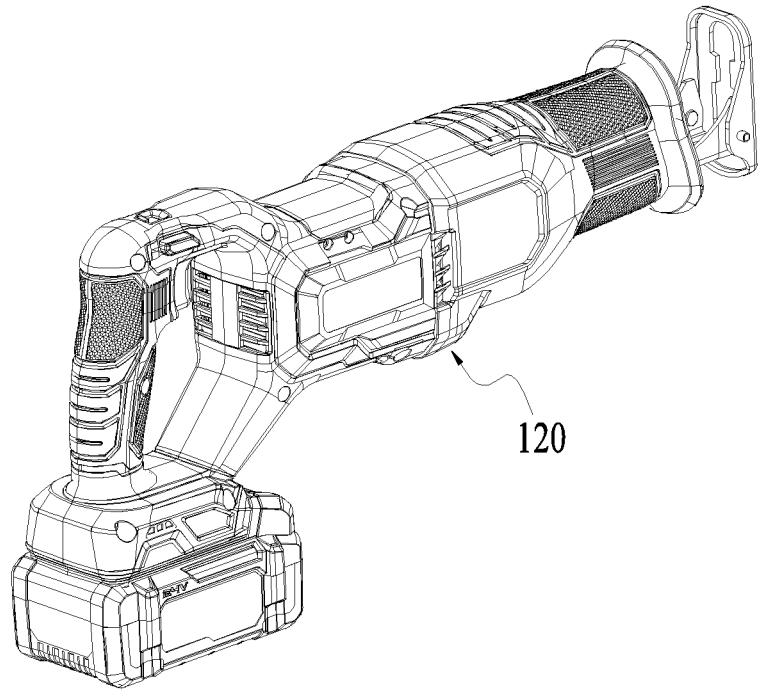
FIG. 12 is a perspective view of a reciprocating saw according to example one of the present application.

This example further provides a power tool including the preceding motor 100. The power tool may be a circular saw 110 shown in FIG. 11, a reciprocating saw 120 shown in FIG. 12, or another power tool with the motor. The power tool provided in this example uses the preceding motor 100 and thus has the advantage of high operation stability.

Figure 13:
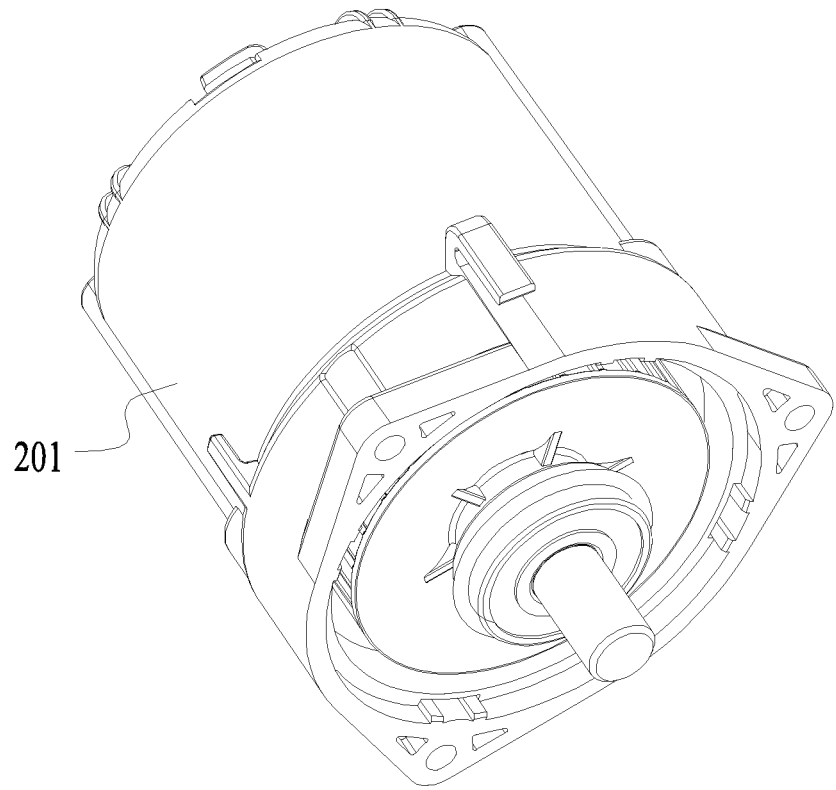
FIG. 13 is a perspective view of a motor according to example two of the present application.
Figure 14:
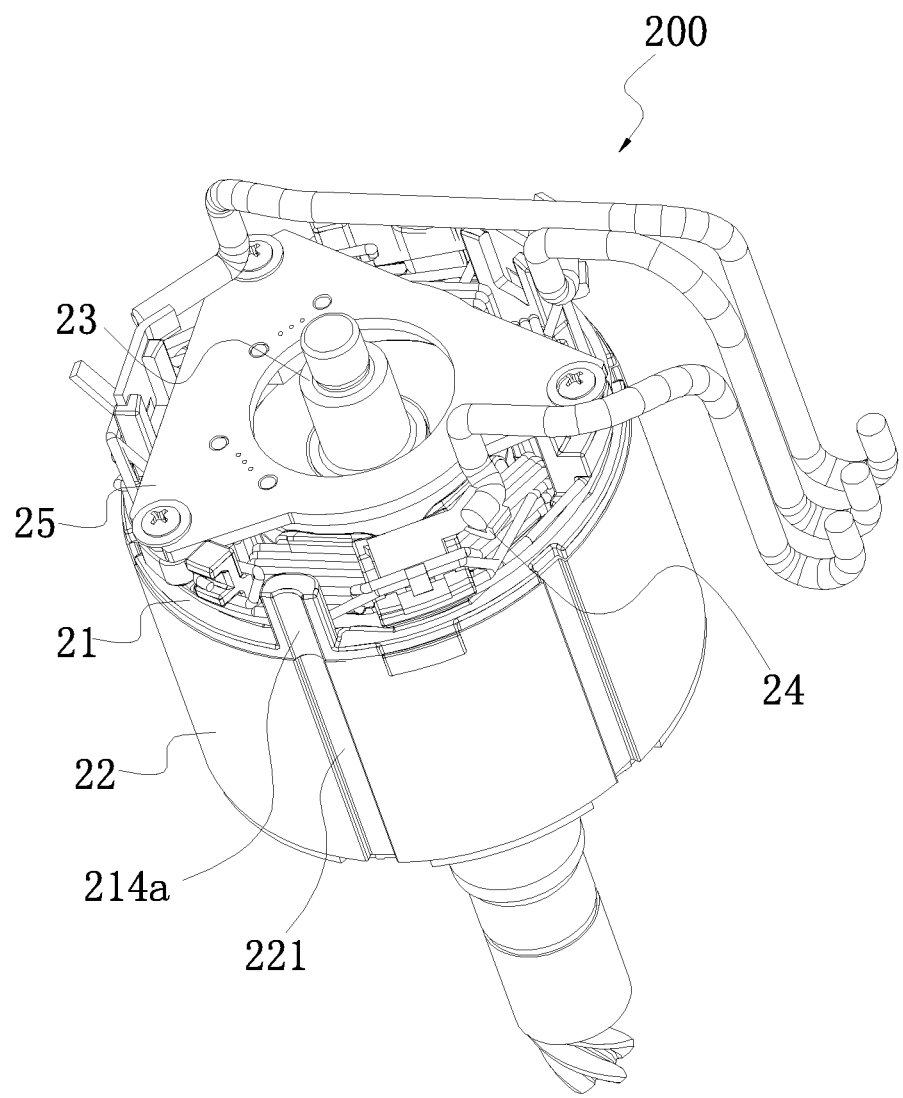
FIG. 14 is a perspective view of the motor in FIG. 13 of the present application without a housing.
Figure 15:
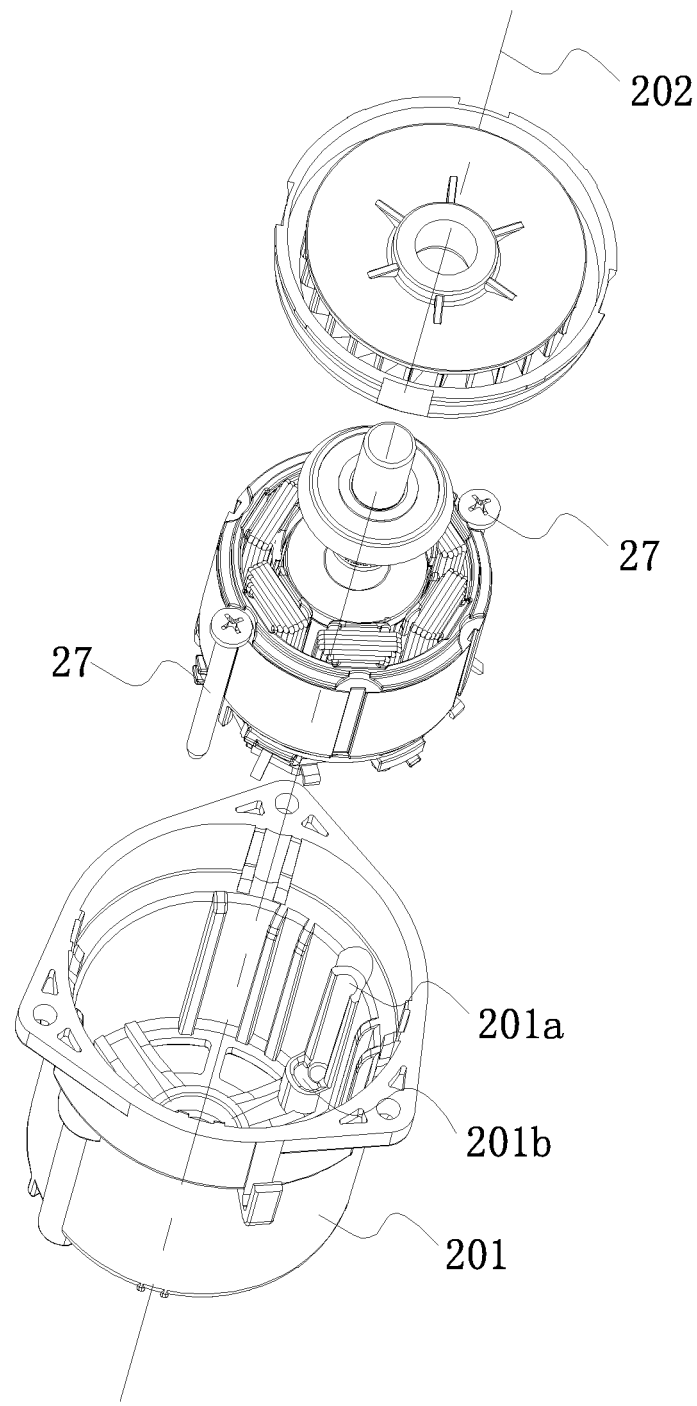
FIG. 15 is an exploded view of the motor in FIG. 13 of the present application.
Figure 16:
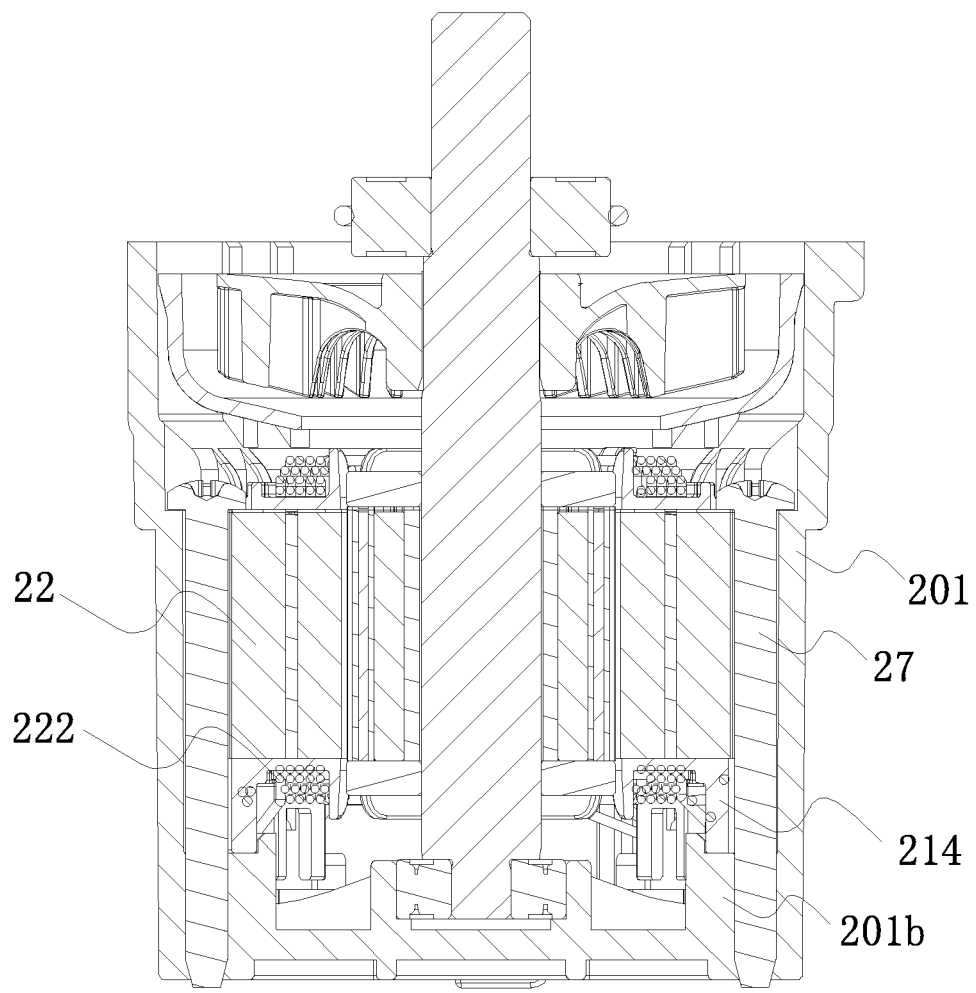
FIG. 16 is a sectional view of the motor in FIG. 13 of the present application.
Figure 17:
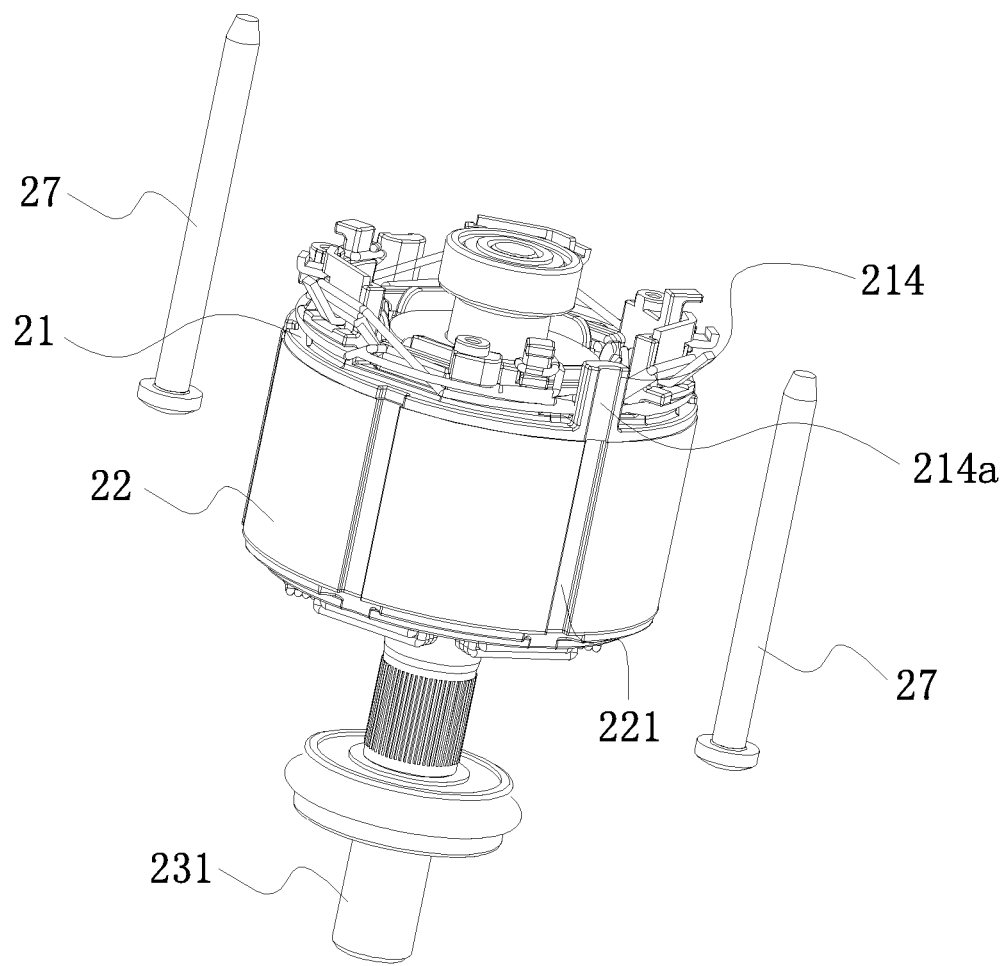
FIG. 17 is an exploded view of a partial structure of the motor in FIG. 14 of the present application.
Figure 18:
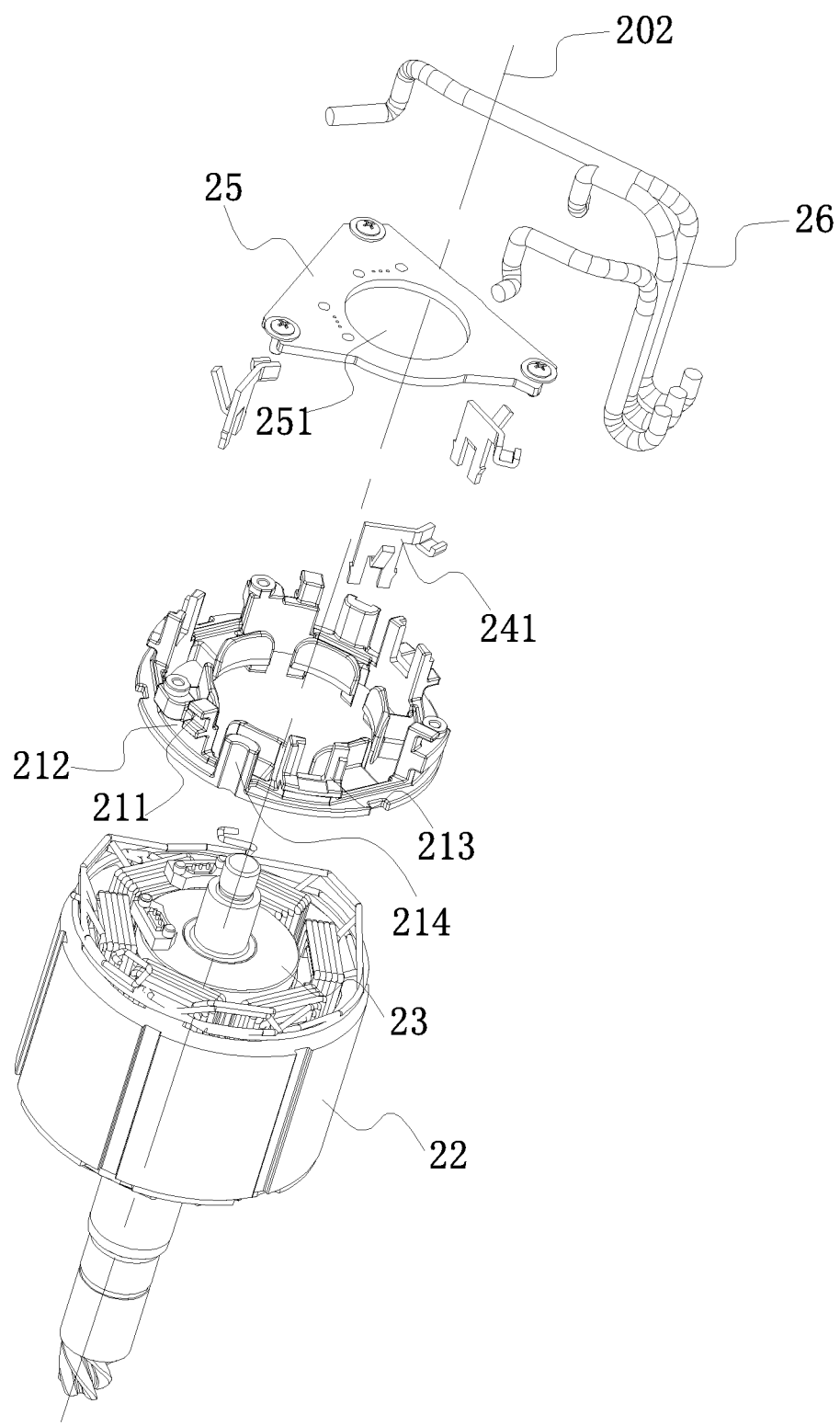
FIG. 18 is an exploded view of the motor in FIG. 14 of the present application.

A motor 200 according to example two of the present application is shown in FIGS. 13 and 14. The motor 200 in example two differs from the motor 100 in example one in that a terminal assembly 24 is disposed in a different mode and has a different structure. The same points as those in example one are all applied to this example. Technical solutions in this example are described below in detail.

As shown in FIGS. 13 to 19, in this example, the motor 200 includes a first end plate 21 and a second end plate which are configured for insulation and to fix a winding 222. The first end plate 21 includes a first side surface and a second side surface. The first side surface is used for an input end and an output end of the winding 222 to be wound on; and the second side surface is configured to close and fix a stator assembly 22 and a rotor assembly 23. Specifically, the first side surface is formed with a first protrusion 211 for fixing the winding 222. The winding 222 is fixed at the first protrusion 211 and starts to be wound into wire slots 212 on the first side surface. Then the winding 222 is wound around connection arms of a stator core and wound out of the connection arms, passes through the terminal assembly 24, and is wound into the next group of connection arms after passing through the terminal assembly 24. In this example, the terminal assembly 24 can divide the wire slot 212 into multiple layers. When the winding 222 is wound into the wire slot 212 and divided into different layers by the terminal assembly 24, a dimension of the winding 222 in a circumferential direction around a direction of a first straight line 202 can be effectively reduced so that the winding 222 is prevented from protruding from a radial position of the first end plate 202. On the one hand, the radial dimension of the motor 200 can be reduced, and on the other hand, the probability of the winding 222 being worn under an external action can be reduced.

As shown in FIGS. 15 to 18, the motor 200 further includes a housing 201 of the motor which encloses at least part of the stator assembly 22. The housing 201 of the motor is mounted on an outer circumference of the stator assembly 22. A limiting protrusion 214 is provided on the first end plate 21 and configured to fix the housing 201 of the motor along a circumferential direction of a rotor shaft 231 so as to avoid the relative rotation in the circumferential direction between the stator assembly 22 and the housing 201 of the motor during the operation of the motor 200, thereby improving operation stability of the motor 200.

Optionally, the motor 200 further includes a limiting member 27. A first limiting groove 214a is disposed on an outer sidewall of the limiting protrusion 214 along the direction of the first straight line 202. A second limiting groove 221 communicating with the first limiting groove 214a is disposed on an outer sidewall of the stator assembly 22 along the direction of the first straight line 202. A third limiting groove 201a is disposed on an inner circumferential wall of the housing 201 of the motor along the direction of the first straight line 202. The first limiting groove 214a and the second limiting groove 221 directly face and are engaged with the third limiting groove 201a to form a limiting cavity. The limiting member 27 is at least partially connected in the limiting cavity. The limiting member 27 is disposed in the limiting cavity to avoid the relative rotation in the circumferential direction between the housing 201 of the motor and the stator assembly 22, thereby improving mounting stability of the housing 201 of the motor.

Optionally, two ends of the first limiting groove 214a respectively communicate with two ends of the limiting protrusion 214 along the direction of the first straight line 202, and two ends of the second limiting groove 221 respectively communicate with two ends of the outer sidewall of the stator assembly 22 along the direction of the first straight line 202. Such a structure enlarges the space in the limiting cavity, thereby increasing the contact area between the limiting member 27 and the limiting cavity and further ensuring the functions of limitation and anti-rotation.

Optionally, the first limiting groove 214a, the second limiting groove 221, and the third limiting groove 201a are arc-shaped grooves, thereby facilitating machining. No sharp angle exists, thereby avoiding a limiting failure caused by stress concentration. Optionally, the first limiting groove 214a, the second limiting groove 221, and the third limiting groove 201a have an equal opening width. With this structure, the limiting cavity is cylindrical, thereby facilitating the arrangement of a cylindrical limiting member 27.

As an implementation, the limiting member 27 is in an interference connection to an inner wall of the limiting cavity so as to implement the function of anti-rotation. Optionally, the limiting member 27 may be a cylindrical pin having a diameter greater than an inner diameter of the limiting cavity so as to implement the interference connection to the inner wall of the limiting cavity.

As another implementation, the limiting member 27 is a screw, and an internal thread is disposed on part of the inner wall of the limiting cavity. For example, the internal thread may be disposed on the first limiting groove 214a and the third limiting groove 201a opposite to the first limiting groove 214a. Alternatively, the internal thread may be disposed on the second limiting groove 221 and the third limiting groove 201a opposite to the second limiting groove 221. A specific position where the internal thread is disposed is not limited in this example.

The housing 201 of the motor is further provided with a positioning boss 201b in this example. An end surface of the limiting protrusion 214 abuts against an end surface of the positioning boss 201b along the direction of the first straight line 202 so as to limit a limiting boss in an axial direction.

Optionally, one or more limiting protrusions 214 may be provided. Optionally, multiple limiting protrusions 214 may be provided to ensure a limiting effect, and the multiple limiting protrusions 214 are uniformly distributed along the circumferential direction. Two limiting protrusions 214 are symmetrically disposed on the first end plate 21 in this example. Correspondingly, two third limiting grooves 201a are disposed on the housing 201 of the motor 201. To facilitate the assembly of the first end plate 21 and the stator assembly 22, an even number of second limiting grooves 221 are disposed on the outer sidewall of the stator assembly 22. Thus, when the first end plate 21 is mounted, the two limiting protrusions 214 only need to correspond to two of the second limiting grooves 221, respectively. Optionally, in this example, six second limiting grooves 221 are provided.

Figure 19:
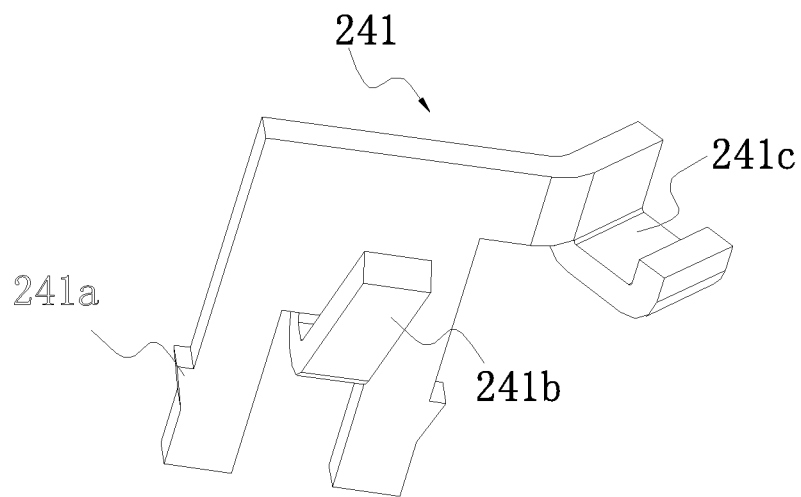
FIG. 19 is a perspective view of a connection terminal in FIG. 18 of the present application.

In this example, the terminal assembly 24 includes multiple connection terminals 241 distributed in circumferential positions of the first end plate 21 around the first straight line 202. Multiple mounting slots 213 are disposed on the first end plate 21 for the mounting of the connection terminals 241. As shown in FIG. 19, the connection terminal 241 includes a connection portion 241a, a wire hooking portion 241b, and a wire connection portion 241c. The connection portion 241a is configured to mate with the mounting slot 213 and can fix the connection terminal 241 to the first end plate 21. A limiting protrusion is formed on or connected to the connection portion 241a and can prevent the connection terminal 241 from being detached from the mounting slot 213. The wire hooking portion 241b has a hook-shaped structure and can divide the wire slot 212 on the first end plate 222. Thus, the direction in which the winding 222 runs is divided so that a wiring portion of the winding 222 is isolated from a wire connection portion of the winding 222, thereby avoiding interference between the wiring portion of the winding 222 and the wire connection portion of the winding 222 and preventing the interference from affecting the insulation effect. The wire connection portion 241c of the connection terminal 241 is also specifically hook-shaped and extends out from a main body of the connection terminal 241 so that a power control wire connected to the wire connection portion 241c can be away from the winding 222, the stator core, or other components. In addition, the wire connection portion 241c is also disposed within a circumferential range formed by the first end plate 21 around the first straight line 202. Thus, after the wire connection portion 241c is connected to the power control wire, the radial dimension of the wire connection portion 241c can be effectively controlled within a preset range. For some power tools each using two halves of a housing, when the motor 200 having a relatively small radial dimension is mounted in the housing, the dimension of a portion of the housing 201 of the motor for mounting the motor 200 can be effectively reduced so that the entire power tool is more compact and convenient for an operator to operate.

The motor 200 further includes a circuit board 25 for control. The circuit board 25 is disposed at one end of the motor 200. Specifically, the circuit board 25 is disposed at an end of the motor 200 where a power control wire 26 is connected. As an implementation, the circuit board 25 is formed with a through hole 251 for the rotor shaft to pass through and a connection hole connected to the first end plate 21. On a plane perpendicular to the direction of the first straight line 202, a projection of the circuit board 25 on the plane along the direction of the first straight line 202 is configured to be triangular. Thus, on the one hand, the circuit board 25 has a relatively high structural strength so that the circuit board 25 is not damaged by vibration generated when the motor 200 rotates at a high speed. On the other hand, with such a configuration, after the circuit board 25 is connected to the first end plate 21, there are still more connection channels between the winding 222 and the outside so that the winding 222 can be better cooled.

This example further provides a power tool including the preceding motor 200. The power tool may be a circular saw 110 shown in FIG. 11, a reciprocating saw 120 shown in FIG. 12, or another power tool with the motor. The power tool provided in this example uses the preceding motor 200 and thus has the advantage of high operation stability.

Figure 20:
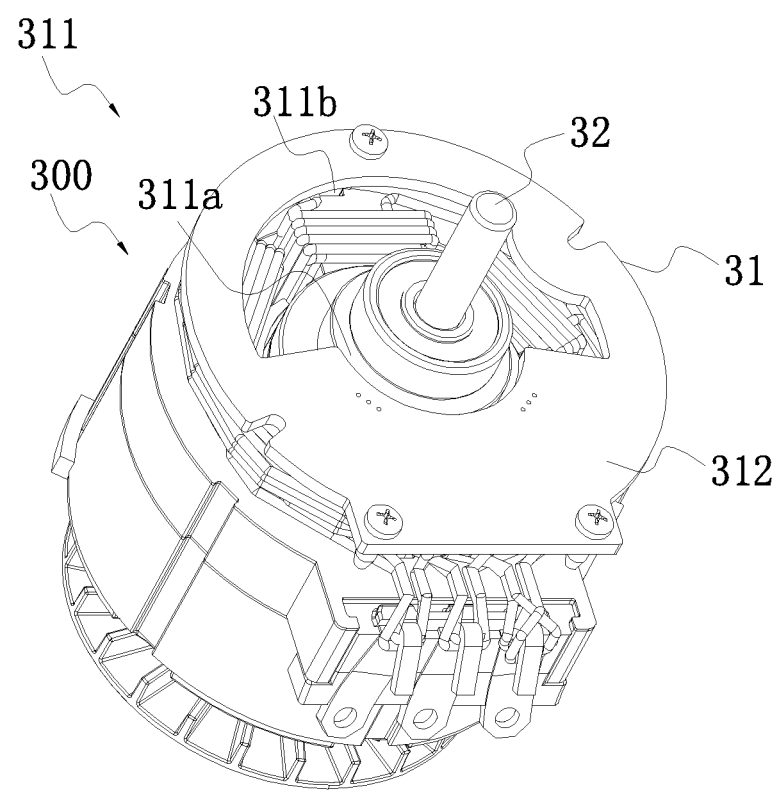
FIG. 20 is a perspective view of a motor without a housing according to example three of the present application.

A motor 300 according to example three of the present application is shown in FIG. 20. The motor 300 in this example differs from the motor 100 in example one in that a circuit board 31 is disposed in a different mode and has a different structure. The same points as those in example one are all applied to this example. Technical solutions in this example are described below in detail.

In this example, the circuit board 31 is disposed at one end of the motor 300 and detachably connected to a first end plate or a second end plate of the motor 300. As an implementation, the circuit board 31 is provided with a through hole 311a for a rotor shaft 32 to pass through and an integration portion 312 for circuit integration. The integration portion 312 is disposed on one side of the circuit board 31. In fact, the integration portion 312 is configured for the installation of all electrical elements. A special-shaped hole 311 is formed on an inner side of the circuit board 31. Specifically, the special-shaped hole 311 includes the through hole 311a for the rotor shaft 32 to pass through and a notch 311b distributed around the rotor shaft 32. The special-shaped hole 311 makes part of a space around the rotor shaft 32 be hollowed out so that the rotor assembly has a larger communication space with the outside and the heat dissipation of the rotor assembly is facilitated.

This example further provides a power tool including the preceding motor 300. The power tool may be a circular saw 110 shown in FIG. 11, a reciprocating saw 120 shown in FIG. 12, or another power tool with the motor. The power tool provided in this example uses the preceding motor 300 and thus has the advantage of high operation stability.

What is claimed is:

1. A motor, comprising:
a stator assembly comprising a stator core and a winding wound onto the stator core, wherein the winding comprises an input end and an output end;
a rotor assembly comprising a rotor shaft extending along a first straight line; and
a terminal assembly configured to connect or fix the input end and the output end,
wherein the stator core comprises first-type laminations, each of the first-type laminations is provided with connection arms for the winding to be wound around and a special-shaped portion, the connection arms and the special-shaped portion are integrally formed, the special-shaped portions are configured to form an access slot for connecting the terminal assembly when the first-type laminations are stacked along a direction parallel to the first straight line, and the access slot is disposed on an outer sidewall of the stator core, and
wherein a length L at which the access slot extends along the first straight line is greater than or equal to 5 mm and less than or equal to 40 mm.

2. The motor according to claim 1, wherein a length L at which the access slot extends along the first straight line is greater than or equal to 5 mm and less than or equal to 20 mm.

3. The motor according to claim 1, wherein the terminal assembly comprises an insertion member made of an insulation material and a wire hooking rack configured to hook a wire, the wire hooking rack is connected to the insertion member, the insertion member comprises a guide rail portion capable of being inserted into the access slot, and a length of the access slot along the first straight line is greater than or equal to a length of the guide rail portion along the first straight line.

4. The motor according to claim 3, wherein the wire hooking rack is configured to be an arc segment deviating from the first straight line and comprises a limiting protrusion capable of being inserted into an insertion slot of the insertion member, the motor comprises a plurality of wire hooking racks, and a gap between two adjacent ones of the plurality of wire hooking racks gradually increases along the first straight line.

5. The motor according to claim 4, wherein the wire hooking rack comprises a wire hooking portion and a connection portion, a plurality of wire hooking portions are disposed parallel to each other, and the connection portion is configured to connect a power control wire.

6. The motor according to claim 1, further comprising a first end plate and a second end plate, wherein the first end plate further comprises a first limiting portion configured to extend along a direction perpendicular to the first straight line and prevent the winding from being detached from the first end plate along the first straight line.

7. The motor according to claim 1, further comprising a first end plate and a second end plate, wherein the first end plate further comprises a first limiting portion configured to extend along a direction obliquely intersecting with the first straight line and prevent the winding from being detached from the first end plate along the direction obliquely intersecting with the first straight line.

8. The motor according to claim 1, further comprising a first end plate and a second end plate respectively disposed on two sides of the stator core and a fan, wherein the fan and the second end plate are mounted on a same side of the stator core and a gap exists between the terminal assembly and the first end plate.

9. The motor according to claim 1, further comprising a first end plate and a second end plate respectively disposed on two sides of the stator core, wherein the first end plate is provided with a limiting protrusion configured to fix a housing of the motor along the first straight line.

10. The motor according to claim 9, wherein a first limiting groove is disposed on an outer sidewall of the limiting protrusion along the first straight line, a second limiting groove communicating with the first limiting groove is disposed on an outer sidewall of the stator assembly along the first straight line, and a third limiting groove is disposed on an inner wall of the housing of the motor along the first straight line, the first limiting groove and the second limiting groove directly face and are engaged with the third limiting groove to form a limiting cavity, and the motor further comprises a limiting member at least partially connected in the limiting cavity.

11. The motor according to claim 10, wherein the first limiting groove, the second limiting groove, and the third limiting groove are arc-shaped grooves.

12. The motor according to claim 10, wherein the limiting member is in an interference connection with an inner wall of the limiting cavity.

13. The motor according to claim 12, wherein the limiting member is a cylindrical pin having a diameter greater than an inner diameter of the limiting cavity.

14. The motor according to claim 10, wherein the limiting member is a screw and an internal thread is disposed on part of an inner wall of the limiting cavity.

15. An inner-rotor motor, comprising:
a stator assembly comprising a stator core and a winding wound onto the stator core, wherein the winding comprises an input end and an output end;
a rotor assembly comprising a rotor shaft extending along a first straight line; and
a terminal assembly configured to connect or fix the input end and the output end,
wherein the stator core comprises first-type laminations, each of the first-type laminations is provided with connection arms and a special-shaped portion, the connection arms and the special-shaped portion are integrally formed, and the special-shaped portions are configured to: when the first-type laminations are stacked along a direction parallel to the first straight line, form an access slot which is configured to connect the terminal assembly, and
wherein a length L at which the access slot extends along the first straight line is greater than or equal to 5 mm and less than or equal to 40 mm.

16. The inner-rotor motor according to claim 15, wherein the terminal assembly comprises an insertion member made of an insulation material and a wire hooking rack configured to hook a wire, the wire hooking rack is connected to the insertion member, the insertion member comprises a guide rail portion capable of being inserted into the access slot, and a length of the access slot along the first straight line is greater than or equal to a length of the guide rail portion along the first straight line.

17. The inner-rotor motor according to claim 16, wherein the wire hooking rack is configured to be an arc segment deviating from the first straight line and comprises a limiting protrusion capable of being inserted into an insertion slot, the inner-rotor motor comprises a plurality of wire hooking racks, and a gap between two adjacent ones of the plurality of wire hooking racks gradually increases along the first straight line.

18. A power tool, comprising a motor which comprises:
a stator assembly comprising a stator core and a winding wound onto the stator core, wherein the winding comprises an input end and an output end;
a rotor assembly comprising a rotor shaft extending along a first straight line; and
a terminal assembly configured to connect or fix the input end and the output end;
wherein the stator core comprises first-type laminations, each of the first-type laminations is provided with connection arms and a special-shaped portion, the connection arms and the special-shaped portion are integrally formed, and the special-shaped portions are configured to form an access slot for connecting the terminal assembly, and
wherein a length L at which the access slot extends along the first straight line is greater than or equal to 5 mm and less than or equal to 40mm.

* * * * *